(12) United States Patent
Woolf et al.

(10) Patent No.: US 7,975,216 B2
(45) Date of Patent: *Jul. 5, 2011

(54) SYSTEM AND METHOD FOR ANNOTATING AN ELECTRONIC DOCUMENT INDEPENDENTLY OF ITS CONTENT

(75) Inventors: Susan D. Woolf, Seattle, WA (US); Andrew Baird, Kirkland, WA (US); Jiang Sheng, Bellevue, WA (US); John L. Beezer, Redmond, WA (US); Darryl E. Rubin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

This patent is subject to a terminal disclaimer.

(21) Appl. No.: 11/964,457

(22) Filed: Dec. 26, 2007

(65) Prior Publication Data

US 2008/0222542 A1   Sep. 11, 2008

Related U.S. Application Data

(63) Continuation of application No. 09/455,805, filed on Dec. 7, 1999, now Pat. No. 7,337,389.

(51) Int. Cl.
*G06F 15/00* (2006.01)
*G09G 5/00* (2006.01)

(52) U.S. Cl. ........ 715/230; 715/232; 715/268; 715/764; 715/862; 345/179; 345/629

(58) Field of Classification Search .......... 715/200–205, 715/206, 207, 209, 210, 226, 229, 230–234, 715/246, 248, 253, 255, 256, 263, 268, 273, 715/700, 731, 738, 751, 760, 762, 764, 768, 772, 773, 862, 863; 345/156, 163, 174, 179, 501, 594, 619, 629, 630, 634, 636, 638, 650, 661, 676, 698

See application file for complete search history.

(56) References Cited

U.S. PATENT DOCUMENTS

| 5,826,025 | A  | * | 10/1998 | Gramlich ...................... 709/217 |
| 5,832,474 | A  | * | 11/1998 | Lopresti et al. ...................... 1/1 |
| 5,893,132 | A  | * | 4/1999 | Huffman et al. .............. 715/201 |
| 5,982,370 | A  | * | 11/1999 | Kamper ........................ 715/760 |
| 6,243,071 | B1 | * | 6/2001 | Shwarts et al. ............... 715/823 |
| 6,384,815 | B1 | * | 5/2002 | Huang .......................... 345/179 |
| 6,714,214 | B1 | * | 3/2004 | DeMello et al. .............. 715/711 |

* cited by examiner

*Primary Examiner* — Maikhanh Nguyen
(74) *Attorney, Agent, or Firm* — Woodcock Washburn LLP (57) ABSTRACT

A system, method, and apparatus for annotating an electronic document independently of its content is provided. According to one variation, a tablet and stylus-based computer is programmed with a document browser that permits a user to annotate documents viewed through the browser. The annotations are stored separately from the viewed document pages but are correlated with the pages such that when a previously annotated page is revisited, annotations relating to that page are retrieved and displayed on top of the page as an "ink" layer. Three different annotation modes are possible: ink, highlight, and erase. Each mode can be selected through a user interface supplied through the browser or through controls embedded in a document.

11 Claims, 10 Drawing Sheets

FROM THE EARTH TO THE MOON
BY JULES VERNE

| | |
|---|---|
| CHAPTER 2 | PRESIDENT BARBICANE'S COMMUNICATION |
| CHAPTER 3 | EFFECT OF THE PRESIDENT'S COMMUNICATION |
| CHAPTER 4 | REPLY FROM THE OBSERVATORY OF CAMBRIDGE |
| CHAPTER 5 | THE ROMANCE OF THE MOON |
| CHAPTER 6 | THE PERMISSIVE LIMITS OF IGNORANCE AND BELIEF |
| CHAPTER 7 | THE HYMN OF THE CANNON-BALL |
| CHAPTER 8 | HISTORY OF THE CANNON |
| CHAPTER 9 | THE QUESTION OF THE POWDERS |
| CHAPTER 10 | ONE ENEMY V.25 MILLIONS OF FRIENDS |
| CHAPTER 11 | FLORIDA AND TEXAS |
| CHAPTER 12 | URBI ET ORBI |
| CHAPTER 13 | STONES HILL |
| CHAPTER 14 | PICKAXE AND TROWEL |
| CHAPTER 15 | THE FETE OF THE CASTING — 601 *trash?* |
| CHAPTER 16 | THE COLUMBIAD |
| CHAPTER 17 | A TELEGRAPHIC DISPATCH |
| CHAPTER 18 | THE PASSENGER OF THE ATLANTA |
| CHAPTER 19 | A MONSTER MEETING |
| CHAPTER 20 | ATTACK AND RIPOSTE |
| CHAPTER 21 | HOW A FRENCHMAN MANAGES AN AFFAIR |
| CHAPTER 22 | THE NEW CITIZEN OF THE UNITED STATES |
| CHAPTER 23 | THE PROJECTILE-VEHICLE |
| CHAPTER 24 | THE TELESCOPE OF THE ROCKY MOUNTAINS |
| CHAPTER 25 | FINAL DETAILS |
| CHAPTER 26 | FIRE! |
| CHAPTER 27 | FOUL WEATHER |
| CHAPTER 28 | A NEW STAR |
| CHAPTER 29 | THE FIRST PART |
| CHAPTER 30 | TWENTY MINUTES PAST TEN |

START | PEN | SEARCH | QUICK SHEET | SHORTCUT

SYSTEM AND METHOD FOR ANNOTATING AN ELECTRONIC DOCUMENT INDEPENDENTLY OF ITS CONTENT

CROSS-REFERENCE TO RELATED APPLICATIONS

This application is a continuation of prior U.S. application Ser. No. 09/455,805, filed Dec. 7, 1999, which is incorporated herein by reference.

TECHNICAL FIELD

This invention relates generally to document browsers and pages that are displayed using such browsers. More particularly, the invention provides a method and apparatus for allowing a user to add annotations and other markings to an electronic document independently of the content of the document.

BACKGROUND OF THE INVENTION

Web browsers are conventionally used to display documents created with a standard descriptive language such as Hyper Text Markup Language (HTML). Documents written in such languages can be displayed with various visual and audio effects such as color, animation, sound effects, and the like. The documents may include text, bitmap images, graphics, and other types of content.

Web browsers (or, more generally, "document browsers") typically provide functions which permit a user to advance forward and backward among a series of related pages; to jump to a specified page; to jump to pages that are referenced via a so-called "hyperlink" embedded in a page; and to maintain a list of recently viewed pages. Although frequently used to navigate through web pages on the Internet, document browsers can be used to display pages that reside on a local area network or even a local computer on which the browser executes.

Recently, as computers have become smaller, it has become possible to run browsers on notebook computers, palm-sized computers, and so-called "tablet and stylus" computers. The latter devices typically comprise a thin computer roughly the size of a sheet of paper with a large writing surface that doubles as a display, and a stylus that substitutes for a keyboard. A user can display and edit documents using the stylus as a writing instrument.

One potential application for such hand-held computers is the display of mass-produced documents such as books, maps, and other descriptive material. For example, a user who purchases a textbook or fictional work on a CD-ROM or other medium can display the work using a small computer such as a tablet-based computer.

In some instances, a user may want to annotate or otherwise mark pages displayed on the computer. Using a conventional word processing program, a user can rearrange text, highlight certain words or phrases, or delete portions of the text. Such features require that the user have access to the underlying content (e.g., the descriptive material that forms the work). In the case of copyrighted materials, however, editing capabilities may not be available to modify the underlying materials. Certain text may be copy-protected or otherwise unavailable for editing using normal editing tools, or may not be in a format suitable for word processing. In such circumstances, there may be no practical way for a user to annotate such works. As one example, a student viewing a copy-or edit-protected textbook on a tablet-based computer may have no practical way of making notes directly in the textbook. Such a feature would be desirable notwithstanding the copy protection or unavailability of general editing functions for the document.

SUMMARY OF THE INVENTION

The present invention provides a method and apparatus for users to annotate documents in a document browser without changing the contents of the documents. According to one variation of the invention, a tablet and stylus-based computer is programmed with a document browser that permits a user to annotate documents that are viewed through the browser. The annotations are stored separately from the viewed document pages but are correlated with the pages such that when a previously annotated page is revisited, annotations relating to that page are retrieved and displayed on top of the page as an "ink" layer.

According to one variation of the invention, three different annotation modes are provided: ink, highlight, and erase. Each mode can be selected through a user interface supplied through the browser or through controls embedded in a document. The annotation functions can be implemented as an Active-X® control, as an Applet, or as dedicated code integrated into the browser. Other features and advantages of the invention will become apparent through the following description, the figures, and the appended claims.

DETAILED DESCRIPTION OF THE INVENTION

Figure 1:
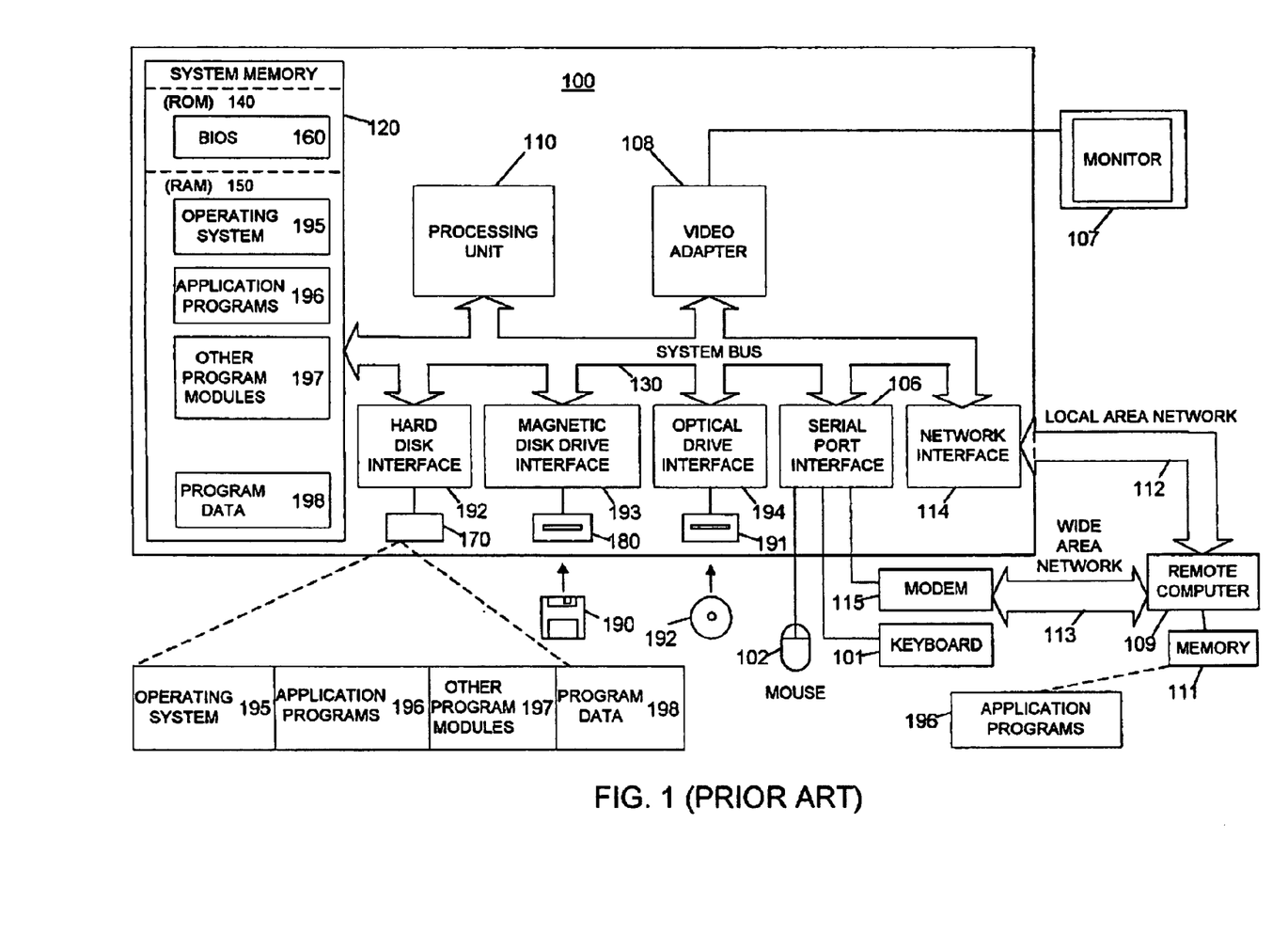
FIG. 1 shows a conventional general-purpose computing environment that can be employed in various embodiments of the invention.

FIG. 1 is a schematic diagram of a conventional general-purpose digital computing environment that can be used to implement various aspects of the invention. Computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
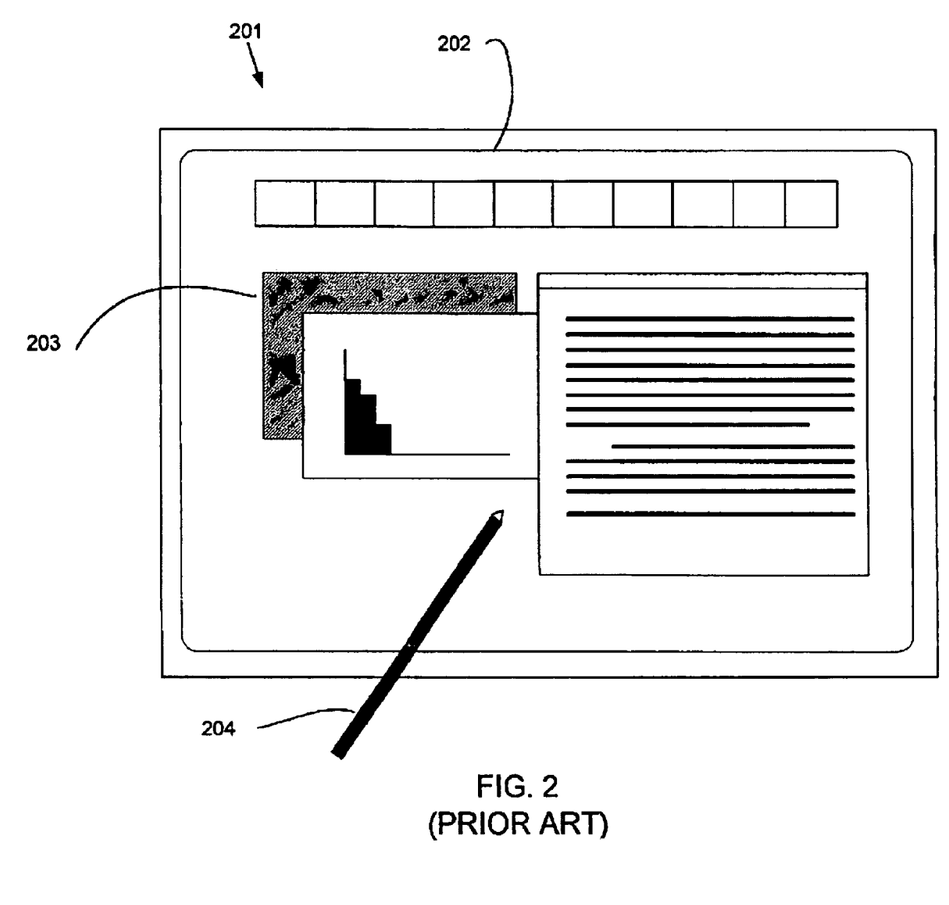
FIG. 2 shows a conventional tablet and stylus-based computer that can be used according to one aspect of the invention.

FIG. 2 shows a tablet and stylus computer that can be used in accordance with various aspects of the present invention. Any or all of the features, subsystems, and functions in the system of FIG. 1 can be included in the computer of FIG. 2. Computer 201 includes a large display surface 202 (e.g., a flat panel display) on which a plurality of windows 203 is displayed. Using stylus 204, a user can select, highlight, and write on the display area. Computer 201 interprets marks made using stylus 204 in order to manipulate data, enter text, and execute conventional computer application tasks such as spreadsheets, word processing programs, and the like. One commercially available tablet and stylus computer incorporating many of these features is the Stylistic 2300 computer sold by Fujitsu Personal Systems, Inc., of Santa Clara, Calif.

A stylus could be equipped with buttons or other features to augment its selection capabilities. In one embodiment, a stylus could be implemented as a "pencil" or "pen" in which one end constitutes a writing portion and the other end constitutes an "eraser" end which, when moved across the display, indicates that portions of the display are to be erased. Other types of input devices such as a mouse, trackball, or the like could be used. Additionally, a user's own finger could be used to select or indicate portions of the displayed image on a touch-sensitive or proximity-sensitive display. Consequently, the term "user input device" is intended to have a broad definition and encompasses many variations on well-known input devices.

Figure 3:
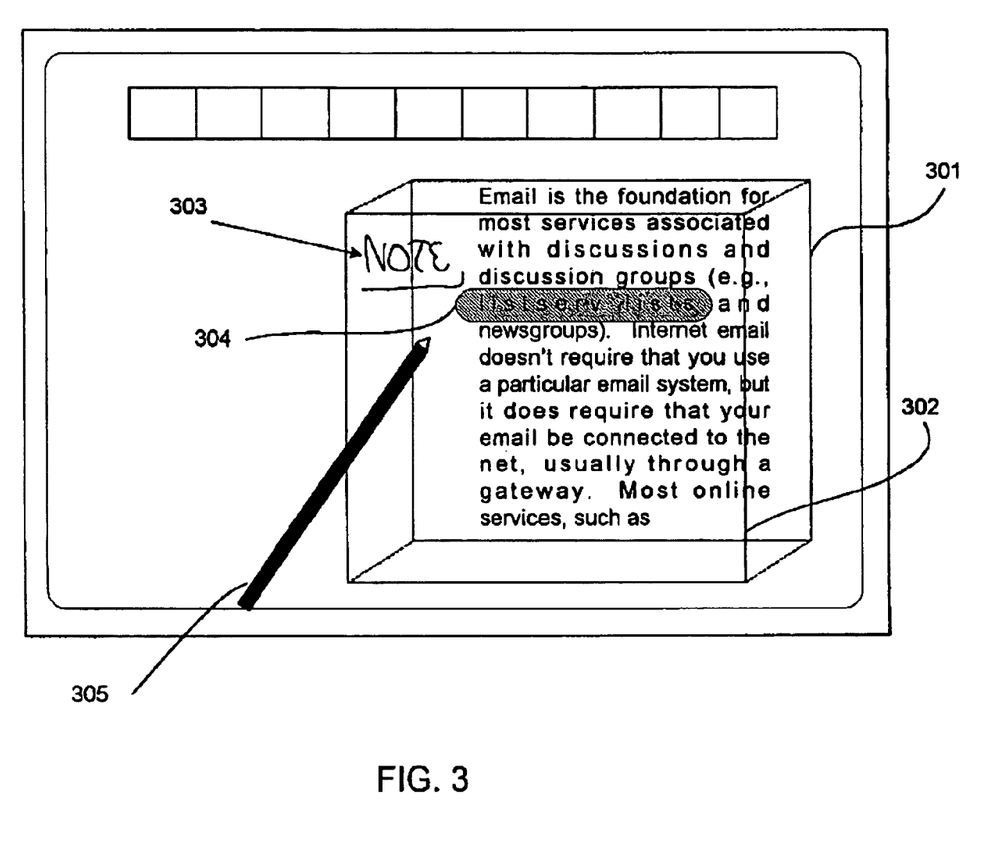
FIG. 3 is a conceptual view showing an ink layer 302 arranged on top of an underlying document page 301. The ink layer may include opaque and translucent markings.

FIG. 3 is a conceptual view showing a computer screen on which a document page 301 is displayed using a document browser. As is conventional, the document page contains text and/or graphics of interest to the user (i.e., "content"). In accordance with the invention, a special "ink" layer 302 is superimposed over the document page 301. Using stylus 305, the user can highlight certain parts of the document 304, which are then shown in a highlighted color (e.g., yellow) against the background text.

Also using stylus 305, the user can mark opaque annotations 303 on the computer display, which appear to be written on the page itself. (Although ink layer 302 is shown as a separate layer in FIG. 3, this view is for conceptual purposes only; the user would see only document page 301 with annotations superimposed over the text and/or graphics on the page). According to one aspect of the invention, annotations made by a user on document page 301 are maintained as a separate "ink" layer 302 that is superimposed over and blended with pixels on the document page. Consequently, even though the annotations appear to be made directly on the underlying document, they are actually maintained in a separate display layer blended with the document page being viewed.

In one embodiment, annotations are specific to each user, such that other users who view the same document will not see a previous user's annotations. This feature can be implemented using log-ins or other user identifiers. For an identical document retrieved at two different remote computers each having the inventive features, annotations made on one remote computer would not show up on the other remote computer, since the annotations are made independently of the document content. It is, however, within the scope of the invention to permit sharing of annotations if desired.

Although the inventive principles are described with respect to a tablet and stylus computer, these principles can be applied to other types of computers, including desktop systems, notebook computers, and the like. Many types of input devices, such as touch-sensitive displays and the like, can be used to indicate those portions of the display that are to be annotated. Moreover, as explained above, many variations on a basic stylus are of course possible, including an embodiment in which the stylus includes a writing end and an "erasing" end.

Figure 4:
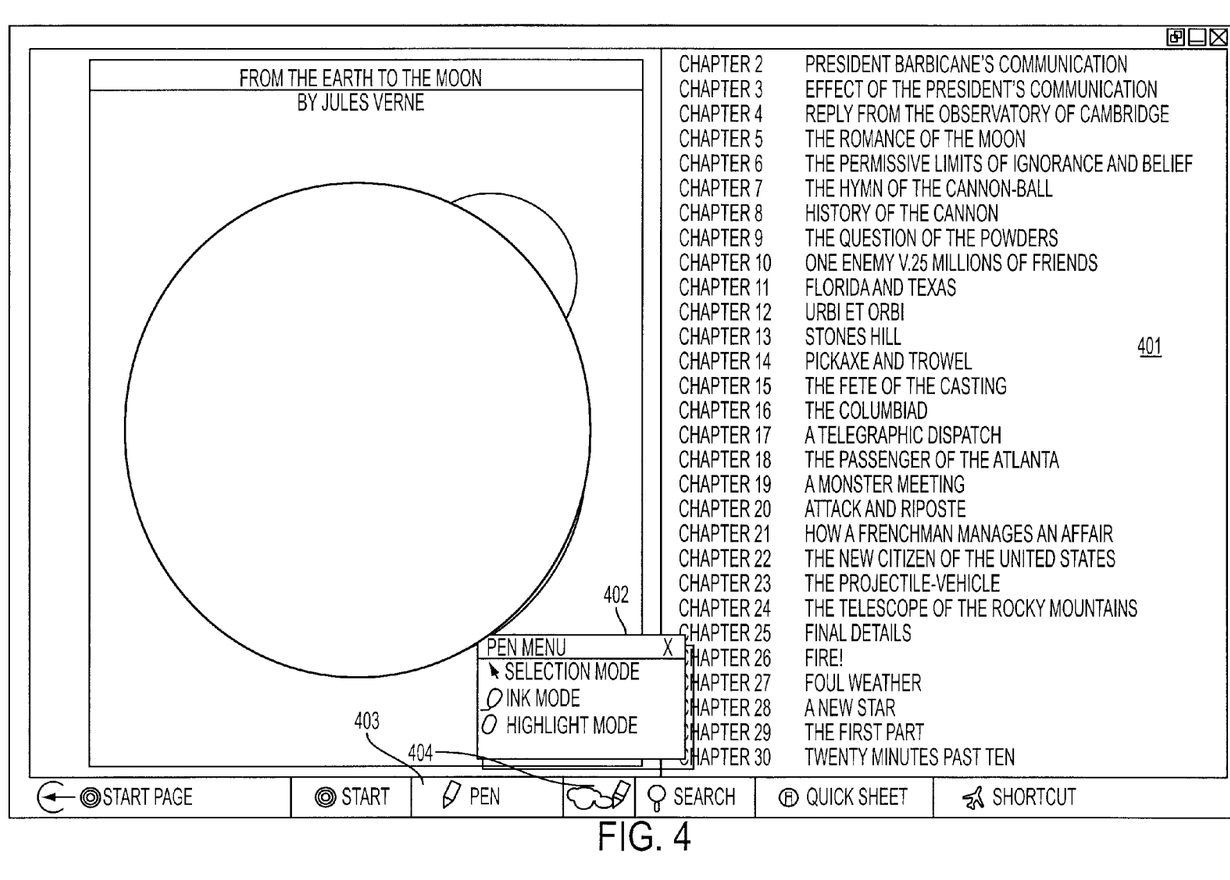
FIG. 4 shows a user interface on a computer screen including a menu 402 that permits a user to select from among a plurality of annotation modes on a displayed document.

FIG. 4 shows a user interface on a computer screen on which a document page 401 is displayed using a document browser. In accordance with one embodiment of the invention, the user interface includes an annotation mode selection menu 402 that permits a user to select from among a plurality of annotation modes for a displayed document. By tapping the stylus on pen button 403, the user can cause the annotation mode selection menu 402 to be displayed. A mode indicator 404 indicates the current annotation mode for the document browser.

According to one variation of the invention, these modes can include an "ink" mode, a "highlight" mode, and an "erase" mode. Additionally, a "selection" mode permits the user to switch to normal browser functions. As shown in FIG. 4, the user interface is already in "erase" mode (indicated by mode indicator 404), so that "erase" is not shown as one of the available modes in menu 402.

It is not necessary to provide an explicit "mode selection" feature as described above; instead, mode selection can be implicit in the manner by which the input device is used. As one example, a stylus could be used to provide an ink mode when the stylus is used as a writing implement; a highlighting mode when the stylus is held a certain way or when a button is pressed on the stylus; and an erase mode when an "erasing" end of the stylus is moved across portions of the display. As another example, one of the modes (e.g., the ink mode) could be established as a default mode when a user input device is manipulated, with other modes being selected based on additional user inputs or manipulations or even voice commands, for example. Many other variations are of course possible.

Figure 5:
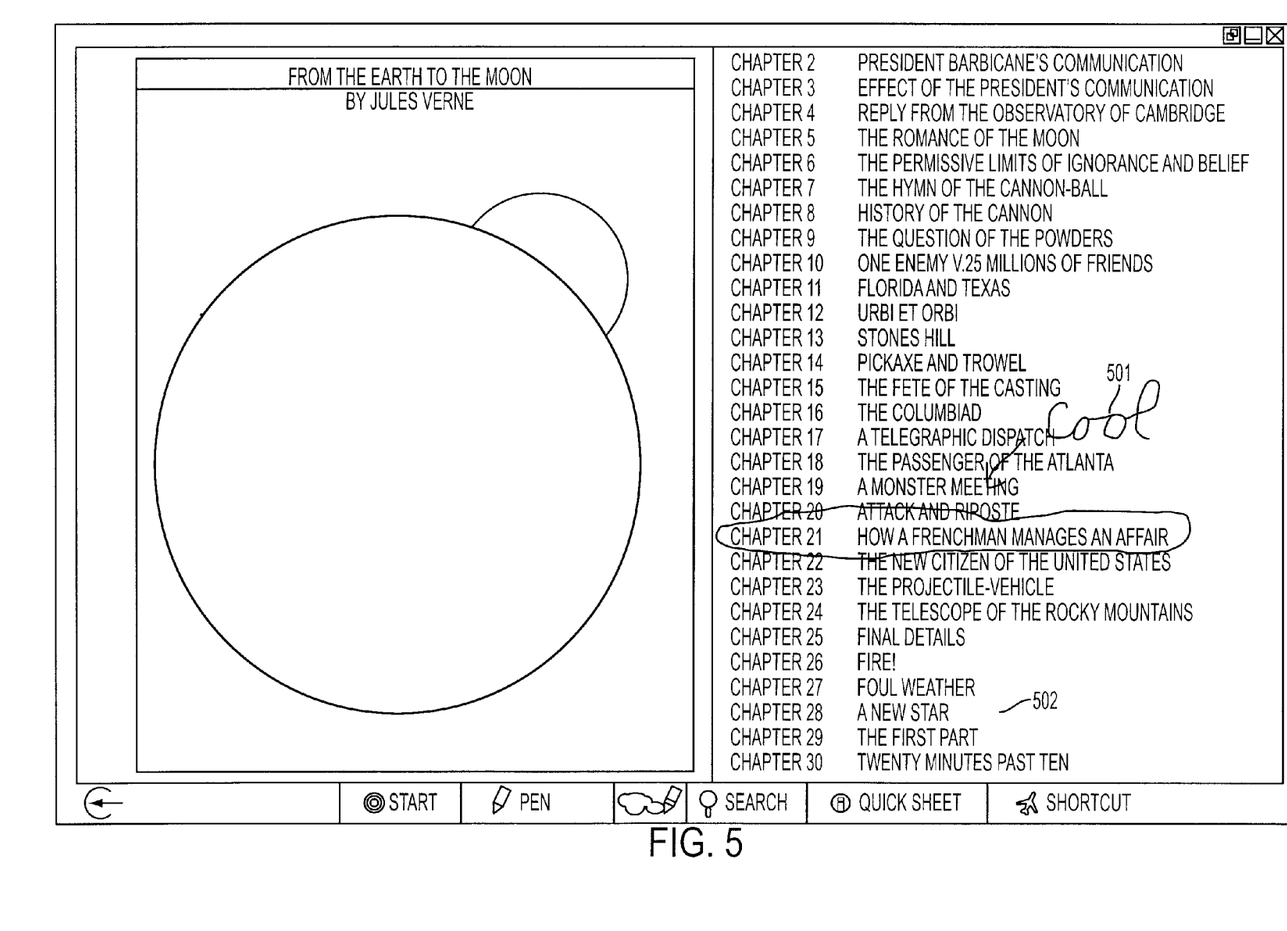
FIG. 5 shows a user interface on a computer screen including an opaque annotation 501 and a highlighted annotation 502, both superimposed over a displayed document.

FIG. 5 shows a user interface on a computer screen including the document of FIG. 4. Using the "ink" mode, the user has annotated a portion of the document 501 with an opaque ink color (e.g., black or blue). The user has also highlighted a different portion of the document 502 using the "highlight" mode. The highlighted portion 502 appears in a translucent color (e.g., yellow) superimposed over the underlying document. Using the "ink" and "highlight" modes, the user is able to annotate pages viewed through the document browser as needed.

Figure 6:
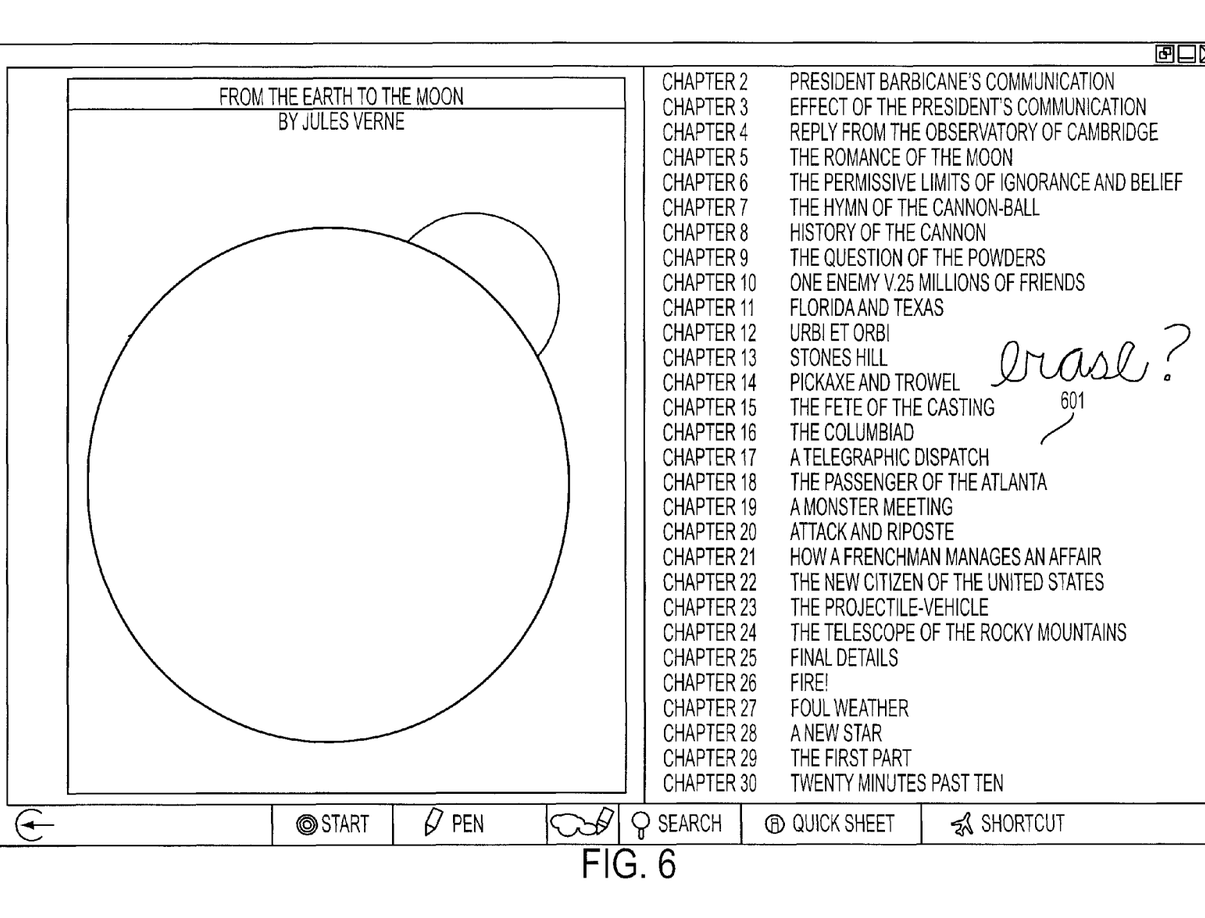
FIG. 6 shows a user interface on a computer screen including an opaque annotation 601 in a pre-erase state.
Figure 7:
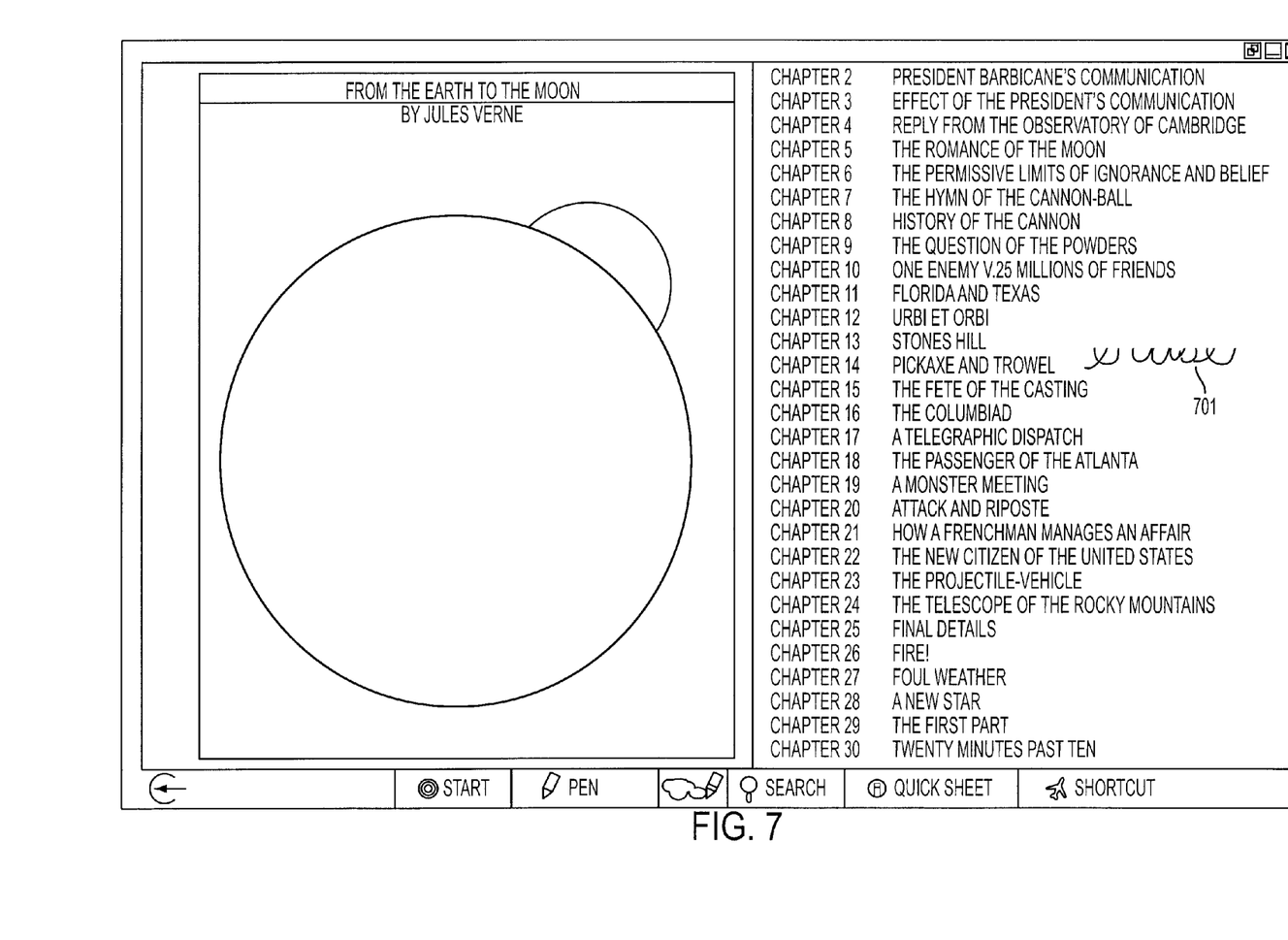
FIG. 7 shows a user interface on a computer screen including an opaque annotation 701 in a post-erase state, where the annotation has been partially erased.

FIGS. 6 and 7 show one possible approach for implementing an "erase" mode. FIG. 6 shows a pre-erase screen in which the user has annotated a document page using an opaque ink color 601. FIG. 7 shows the same screen of FIG. 6 after the user has selected the "erase" mode and moved the stylus across a portion of the annotated region 601, leaving a partially erased annotation 701. Using the "erase" mode, the user can remove previous annotations from the computer screen. The width of the eraser function can be varied to suit various applications, or it can even be user-selectable.

Figure 8:
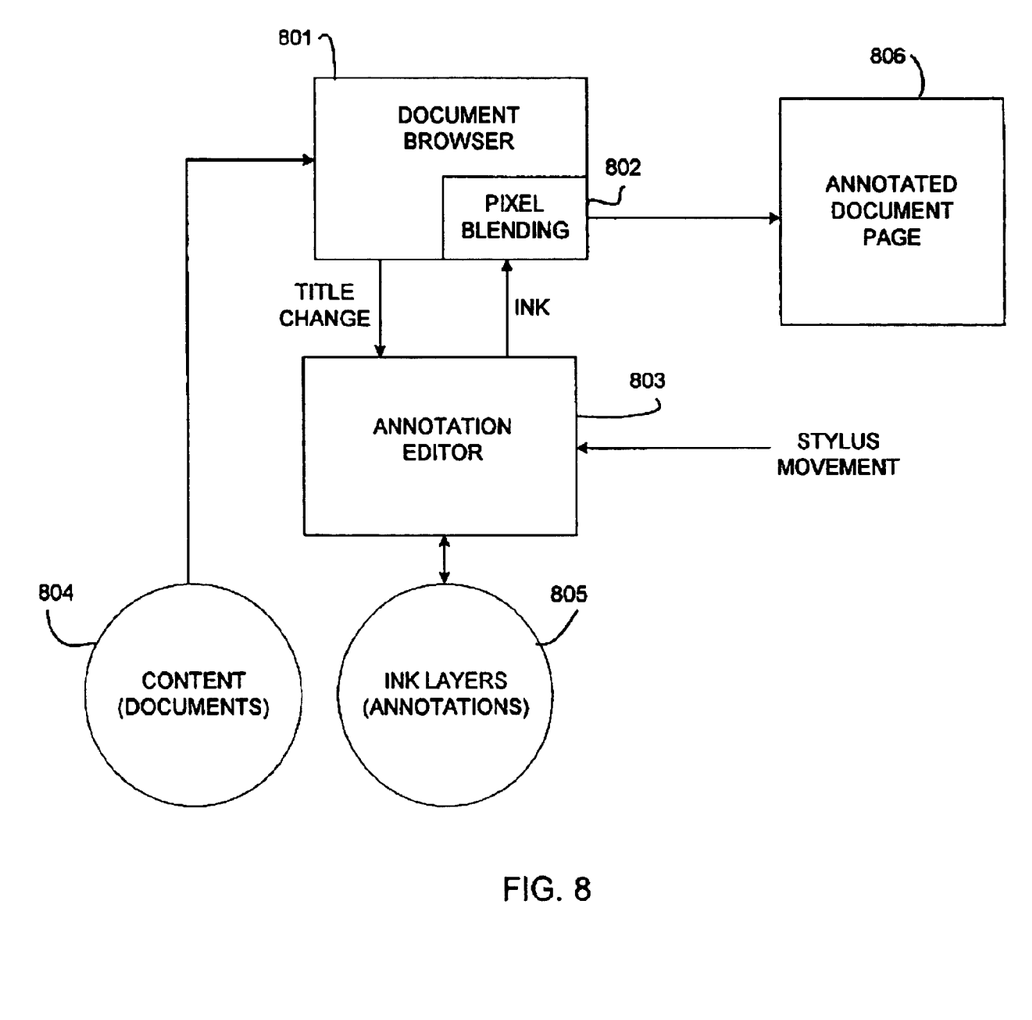
FIG. 8 shows one possible software design for implementing various principles of the invention.

FIG. 8 shows one possible software design for implementing various principles of the invention. As shown in FIG. 8, a document browser 801 permits a user to retrieve and view content in the form of documents from a document storage area 804. The documents can be stored locally on the user's computer (e.g., on CD-ROM disks and the like), or they can be stored remotely and retrieved across a network such as the Internet. Annotation editor 803 retrieves and stores annotations in "ink layers" stored in a storage device or area 805. As with document storage, ink layer storage area 805 can be local or remotely located.

Annotations retrieved from storage area 805 are provided to pixel blending function 802, which is indicated as a newly provided function within document browser 801. Alternatively, pixel blending function 802 can be provided separately (e.g., in the operating system, for example). In general, pixel blending function 802 blends pixels from a document page with corresponding pixels from an annotation or "ink" layer mapped to that document page, and generates a blended pixel image that is displayed as an annotated document page 806.

In one embodiment, each opaque annotation pixel replaces a corresponding pixel on a document page, whereas each translucent annotation pixel (e.g., highlighting) is blended with a corresponding pixel value on a document page to produce a different color from that in the original document. Pixel blending functions such as alpha blending are well known and no further elaboration of this feature is required.

Annotations can be saved as "strokes" in a data structure and stored locally in a file associated with the currently displayed page of the document. Each stroke can comprise a stroke type (e.g., annotate, highlight or erase), a stroke width, and a stroke color in addition to coordinates indicating the stroke trajectory. In various embodiments, annotation storage occurs automatically, such that whenever the input device is released (or lifted), a new stroke is automatically stored.

Alternatively, it is of course possible to store annotations as a bitmap image having the same or similar dimensions as the presently displayed document page, such that the annotation image can be superimposed over the document page. Combinations of these approaches are of course possible. For example, opaque annotations could be stored in a data structure, while highlighting could be stored as a bitmap image.

According to one embodiment, document browser 801 generates a title change event to annotation editor 803 each time a different document page is selected through document browser 801. This permits annotation editor 803 to retrieve previously stored annotations for a page, and to create a new annotation file for a newly displayed page. Annotation editor 803 intercepts stylus movements from a stylus or other cursor movement device and provides them to document browser 801 after any annotation processing has been performed. In one embodiment, browser 801 can constantly generate "screen paint" commands that are intercepted so that a blended image is continuously generated.

Annotation editor 803 can be implemented as an ActiveX® control element, as an Applet, or as other forms of software functions. Annotation editor 803 and any related functions can be embedded into a document viewed through browser 801, such that viewing the document provides the annotation functions.

Figure 9A:
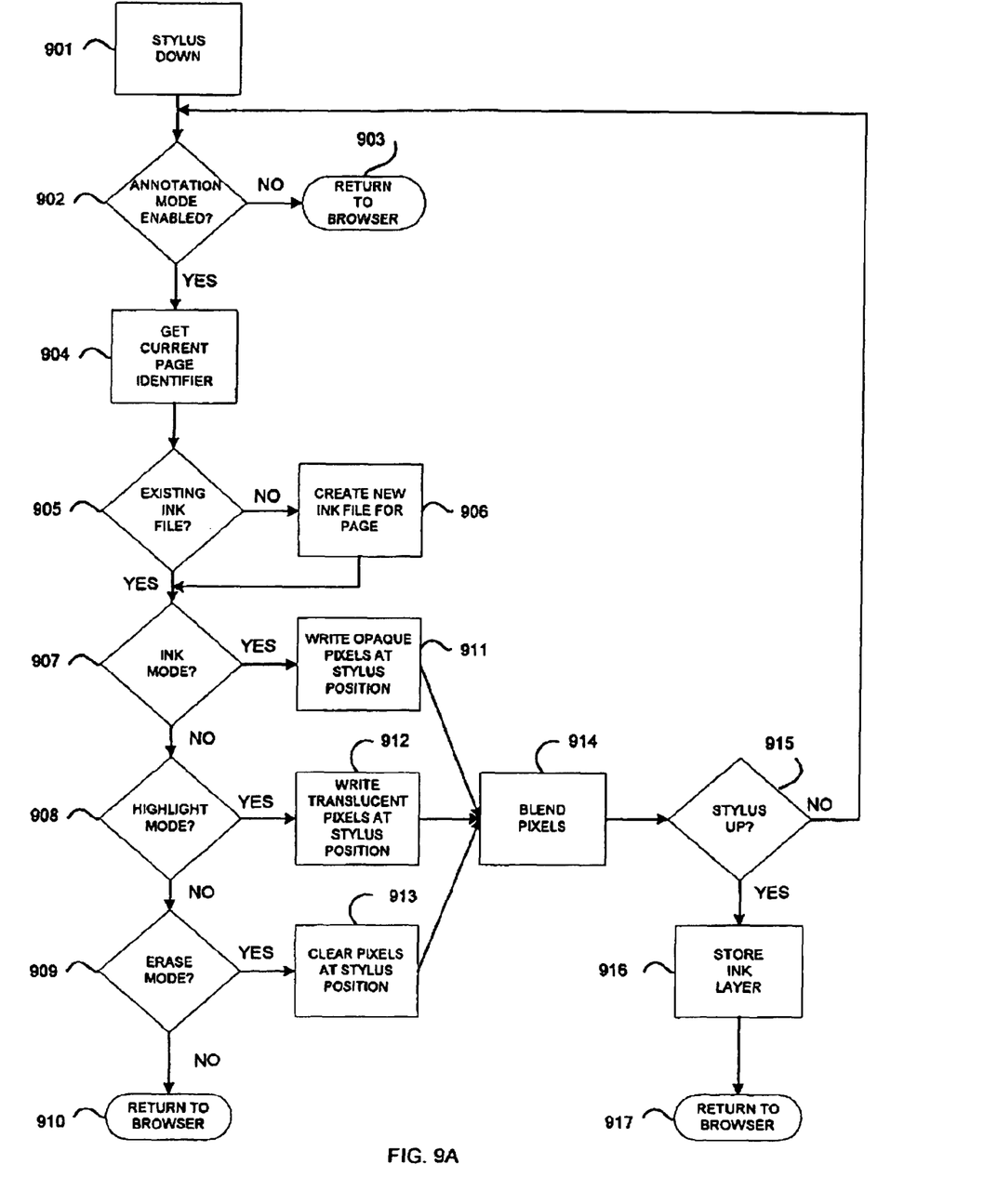
FIG. 9A shows a flowchart indicating various steps that can be executed to provide an annotation function according to certain inventive principles.

FIG. 9A shows a flowchart indicating various steps that can be executed to provide an annotation function according to one embodiment. It will be appreciated that many different approaches for carrying out the inventive principles are possible, and the steps shown are intended to be exemplary only. For example, although the steps are illustrated as being performed sequentially, they can in fact be performed by different components at different times in an object-oriented system using event-driven processing techniques. The steps shown can be implemented in software that is stored on a storage medium such as a disk.

Beginning in step 901, a stylus "down" event is detected. As noted previously, any of various input devices such as a mouse with key clicks or others can be used. In step 902, a test is performed to determine whether the annotation mode has been enabled. (See FIG. 4). If the annotation mode is not presently active, then in step 903 processing returns to the browser (i.e., the stylus movement command is passed through to document browser 801).

In step 904, after it has been determined that the annotation mode is active, the page identifier for the currently displayed page is retrieved. It is contemplated but not necessary that each document page have a unique identifier (e.g., a unique URL). In step 905, a test is performed to determine whether the currently displayed page has a previously existing "ink" or "annotation" file associated therewith. If such an ink file exists, it is retrieved from storage area 805 (see FIG. 8). If no such file exists, a new ink file is created in step 906, preferably using a name that readily corresponds to the displayed document page.

After an ink file has been retrieved or newly created, a test is performed in step 907 to determine whether the annotation mode is "ink" mode. If the current annotation mode is "ink" mode, then in step 911 opaque pixels are written into the ink file at the current stylus position. The number of pixels written can be varied depending on the width or "swath" to be used for the annotation. For a wide swath (e.g., a magic marker type of annotation), a plurality of pixels can be written surrounding the current stylus position. For a narrower swath (e.g., a pinpoint type of annotation), a smaller number of pixels (e.g., one pixel wide) can be written to the annotation file at the current stylus position. It is within the scope of the invention to permit the user to select or change the width of the annotation marks.

In step 914, a pixel blending operation is performed, such that the pixels in the ink file are blended with pixels from the document, which causes the document to be displayed with annotations. (As described above, opaque pixels may entirely replace those in the viewed document). In step 915, a test is performed to determine whether the stylus or other input device has been lifted or disengaged. If so, then in step 916 the ink layer is stored, and processing returns to the browser in step 917. Otherwise, annotations continue at step 902, and can be stored as part of the same stroke. If the user again presses the stylus or input device against the document, then annotations resume in step 901.

Returning to step 907, if the present mode is not "ink" mode, then a test is made in step 908 to determine whether highlight mode was selected. If highlight mode is active, then in step 912 translucent pixels are written at the current stylus position. For example, yellow, pink, or other translucent colors can be stored at the current stylus position. As before, the pixels are blended in step 914, changing the resulting pixels on output but nevertheless permitting the user to see the original document pixels in a modified form. Processing continues as described previously.

In step 908, if highlight mode is not currently active, then in step 909 a test is performed to determine whether erase mode is active. If so, then in step 913 the pixels at the current stylus position are cleared or zeroed out. As with highlight mode, the width of the erasure can be preset to a swath wider than one pixel, and the width can be different than the highlight or annotation pixel width. As before, the remaining non-erased pixels are blended with the original document image in step 914 and processing continues until the ink layer is stored.

Figure 9B:
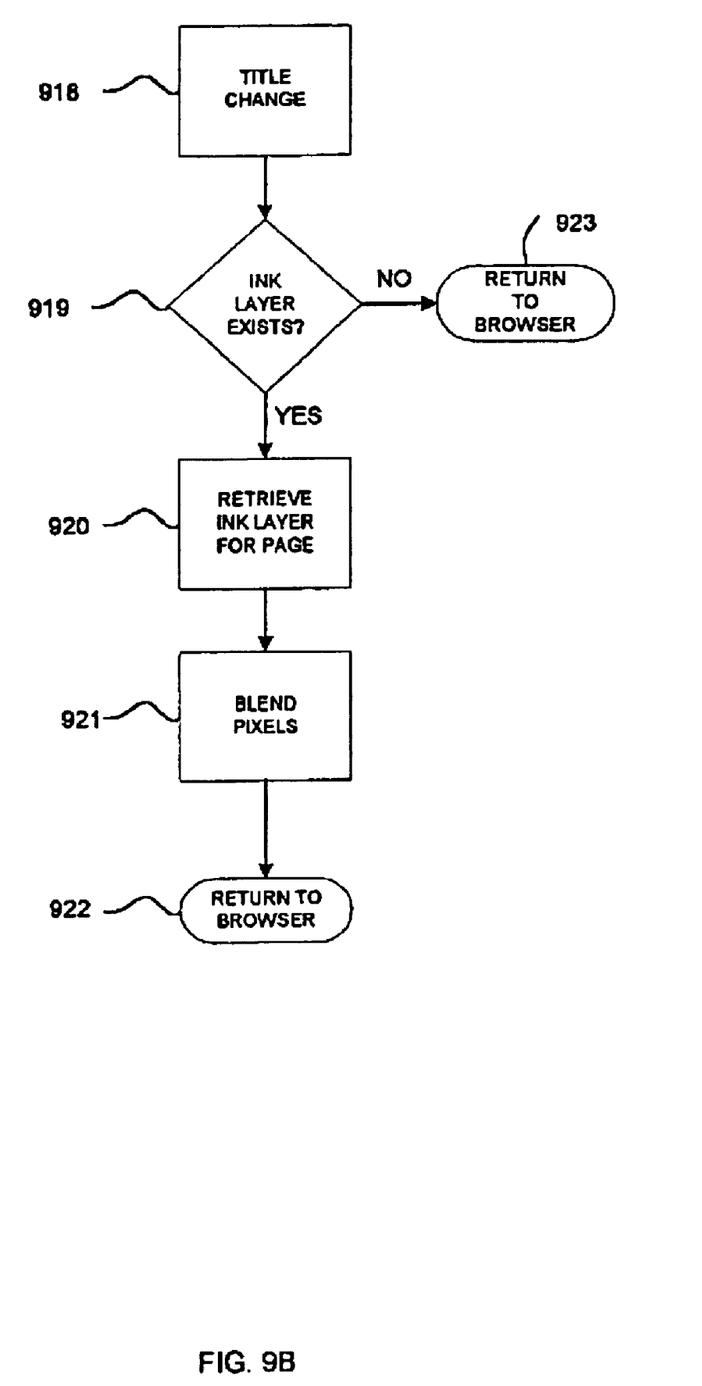
FIG. 9B shows a flowchart indicating how previously created annotations can be superimposed over a document page.

FIG. 9B shows a flowchart indicating how previously created annotations can be superimposed over a document page. In step 918, a title change event is detected in document browser 801, and is sent to annotation editor 803. In various embodiments, a title change event occurs whenever the presently viewed document page changes. This may occur when the user jumps to a new document page, or when the user moves forward or backward among a sequence of related document pages, such as might occur in a book or a set of related hyperlinks. Other types of events, such as a "status change" event, for example, can be used instead of a title change event.

In step 919, a test is performed to determine whether an ink layer already exists for the new document page. If no ink layer exists for the page, processing returns to the document browser and the page is displayed normally. If an ink layer exists for the page, then in step 920 the ink layer is retrieved. In step 921, the pixels from the retrieved ink layer are blended with the displayed page and the resulting image appears on the computer display. Thereafter, processing returns to the browser. A separate ink layer file can be created for each document page, or one ink file can be created for an entire document and indexed according to pages on which the annotations appear. Other approaches are of course possible.

Thus has been described a system, method, and apparatus for annotating electronic document pages using an annotation editor that stores annotations independently of the content of the underlying document. It will be appreciated that many modifications and variations of the invention are possible, and the scope of the invention is not limited by the specific examples and descriptions herein.

We claim:

1. A computer-implemented method of annotating pages of an electronic document independently of the contents of the electronic document, the computer-implemented method comprising the steps of:

displaying a page of the electronic document on a computer display device using a document browser that permits a user to move forward and backward among a plurality of document pages;

detecting a selection of an annotation mode that permits the user to annotate the currently displayed document page, wherein at least an ink annotation mode, a highlight annotation mode, and an eraser annotation mode are provided as options from which the annotation mode is selected;

receiving annotation stroke input from a user input device indicating movement associated with the user input device for a continuous distance about a stroke location on the currently displayed document page;

storing annotation stroke data based on the received annotation stroke input, said annotation stroke data comprising data corresponding to the stroke location and the movement associated with the user input device, wherein the annotation stroke data is stored in an annotation file associated with the user, the annotation file stored separately from the electronic document;

storing annotations made in the highlight annotation mode as a bitmap image; and blending pixels in the annotation file with pixels in the electronic document to cause the computer display device to display the electronic document with annotations.

2. The computer-implemented method of claim 1, wherein the user input device comprises a stylus.

3. The computer-implemented method of claim 2, wherein the stylus has a first end portion and a second end portion, the computer-implemented method further comprising the steps of:
   detecting whether the first end portion of the stylus or the second end portion of the stylus is being moved across the computer display device;
   if the first end portion of the stylus is being moved across the computer display device, then selecting the ink annotation mode; and
   if the second end portion of the stylus is being moved across the computer display device, then selecting the eraser annotation mode.

4. The computer-implemented method of claim 1, wherein the user input device is selected from the group consisting of a mouse, a trackball, a touch-sensitive display, and a proximity-sensitive display.

5. A computer-readable storage medium storing computer-executable instructions that, when executed by a computer, cause the computer to:
   display a page of an electronic document on a display device using a document browser that permits a user to move forward and backward among a plurality of document pages;
   detect a selection of an annotation mode that permits the user to annotate a currently displayed document page, wherein at least an ink annotation mode, a highlight annotation mode, and an eraser annotation mode are provided as options from which the annotation mode is selected;
   receive annotation stroke input from a user input device, the annotation stroke input indicating movement associated with the user input device for a continuous distance about a stroke location on the currently displayed document page;
   store annotation stroke data based on the received annotation stroke input, said annotation stroke data comprising data corresponding to the stroke location and the movement associated with the user input device, wherein the annotation stroke data is stored in an annotation file associated with the user, the annotation file stored separately from the electronic document;
   storing annotations made in the highlight annotation mode as a bitmap image; and
   blending pixels in the annotation file with pixels in the electronic document to cause the computer display device to display the electronic document with annotations, wherein the computer-readable storage medium is not a signal.

6. The computer-readable storage medium of claim 5, wherein the user input device comprises a stylus.

7. The computer-readable storage medium of claim 6, wherein the stylus has a first end portion and a second end portion, and wherein the computer-readable storage medium stores further computer-executable instructions that, when executed by the computer, cause the computer to:
   detect whether the first end portion of the stylus or the second end portion of the stylus is being moved across the display device;
   if the first end portion of the stylus is being moved across the display device, then select the ink annotation mode; and
   if the second end portion of the stylus is being moved across the display device, then select the eraser annotation mode.

8. The computer-readable storage medium of claim 5, wherein the user input device is selected from the group consisting of a mouse, a trackball, a touch-sensitive display, and a proximity-sensitive display.

9. A computer system for annotating pages of an electronic document independently of the contents of the electronic document, the computer system comprising:
   a display device;
   a user input device; and
   a computing device in communication with the display device and the user input device, the computing device comprising a processor and a memory storing processor-executable instructions that, when executed by the processor, cause the processor to:
   display a page of the electronic document on the display device using a document browser that permits a user to move forward and backward among a plurality of document pages;
   detect a selection of an annotation mode that permits the user to annotate a currently displayed document page, wherein at least an ink annotation mode, a highlight annotation mode, and an eraser annotation mode are provided as options from which the annotation mode is selected;
   receive annotation stroke input from the user input device, the annotation stroke input indicating movement associated with the user input device for a continuous distance about a stroke location on the currently displayed document page;
   store annotation stroke data based on the received annotation stroke input, said annotation stroke data comprising data corresponding to the stroke location and the movement associated with the user input device, wherein the annotation stroke data is stored in an annotation file associated with the user, the annotation file stored separately from the electronic document;
   store annotations made in the highlight annotation mode as a bitmap image; and
   blend pixels in the annotation file with pixels in the electronic document to cause the computer display device to display the electronic document with annotations.

10. The computer system of claim 9, wherein the user input device comprises a stylus.

11. The computer system of claim 10, wherein the stylus has a first end portion and a second end portion, and wherein the memory stores further processor-executable instructions that, when executed by the processor, cause the processor to:
   detect whether the first end portion of the stylus or the second end portion of the stylus is being moved across the display device;
   if the first end portion of the stylus is being moved across the display device, then select the ink annotation mode; and
   if the second end portion of the stylus is being moved across the display device, then select the eraser annotation mode.

* * * * *